(12) United States Patent
Bhatia (10) Patent No.: US 7,493,520 B2
(45) Date of Patent: Feb. 17, 2009

(54) SYSTEM AND METHOD FOR VALIDATING THE GRAPHICAL OUTPUT OF AN UPDATED SOFTWARE MODULE

(75) Inventor: Ankit Bhatia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 642 days.

(21) Appl. No.: 11/147,020

(22) Filed: Jun. 7, 2005

(65) Prior Publication Data

US 2006/0274072 A1 Dec. 7, 2006

(51) Int. Cl.
*G06F 11/00* (2006.01)
(52) U.S. Cl. .......................... 714/38; 717/130; 717/168
(58) Field of Classification Search .................. 714/37, 714/38; 717/130, 168, 170
See application file for complete search history.

(56) References Cited

U.S. PATENT DOCUMENTS

| | | | | |
|---|---|---|---|---|
| 5,335,342 A * | 8/1994 | Pope et al. | ..................... | 714/38 |
| 6,055,015 A * | 4/2000 | Edwards | ..................... | 348/192 |
| 6,104,417 A * | 8/2000 | Nielsen et al. | .............. | 345/542 |
| 6,560,620 B1 * | 5/2003 | Ching | ........................ | 715/229 |
| 6,785,839 B2 * | 8/2004 | Ko et al. | ......................... | 714/8 |
| 6,934,934 B1 * | 8/2005 | Osborne et al. | ............. | 717/126 |
| 7,369,129 B2 * | 5/2008 | Mori et al. | ................... | 345/443 |
| 2004/0153830 A1 * | 8/2004 | Cebula et al. | ................. | 714/38 |
| 2005/0283836 A1 * | 12/2005 | Lalonde et al. | ............... | 726/24 |
| 2006/0026465 A1 * | 2/2006 | Kwong et al. | ................. | 714/38 |
| 2006/0069970 A1 * | 3/2006 | Bowers | ..................... | 714/724 |
| 2006/0107121 A1 * | 5/2006 | Mendrala et al. | ............. | 714/38 |
| 2006/0117182 A1 * | 6/2006 | Wolff | ......................... | 713/176 |
| 2006/0143533 A1 * | 6/2006 | Dresser et al. | ................ | 714/38 |

\* cited by examiner

*Primary Examiner*—Joshua A Lohn
(74) *Attorney, Agent, or Firm*—Wolf, Greenfield & Sacks, P.C.

(57) ABSTRACT

A system for validating the output of an updated graphics rendering engine is presented. The system includes two computer systems, with one computer system including an updated graphics rendering engine. The two computers are configured to execute test instructions that cause graphic information to be rendered on the computers. The two computers are further configured to respond to sample requests during the executing of the test instructions. Each computer responds by retrieving the currently rendered data on the computer as a rendered sample. The system also includes a master computer. The master computer is configured to retrieve the rendered samples of the two computers, compare the rendered samples to determine whether there are differences, and if there are differences, report those differences.

20 Claims, 8 Drawing Sheets

SYSTEM AND METHOD FOR VALIDATING THE GRAPHICAL OUTPUT OF AN UPDATED SOFTWARE MODULE

FIELD OF THE INVENTION

The present invention relates to computer systems, and more particularly, to a system and method for validating the graphical output of an updated software module on a computer system.

BACKGROUND OF THE INVENTION

Nearly all software installed on a computer system is updated at some point in time. Unfortunately, as those skilled in the art will appreciate, updating any software introduces the possibility of regression, i.e., the introduction of flaws and/or errors, generally referred to as "bugs", that were not previously evident or present in a prior version.

While there are numerous automated testing systems to determine whether there is regression in an updated version of a typical software application, verifying whether there is regression in an updated version of a graphics rendering engine or graphics interface driver is a very difficult task.

Figure 1:
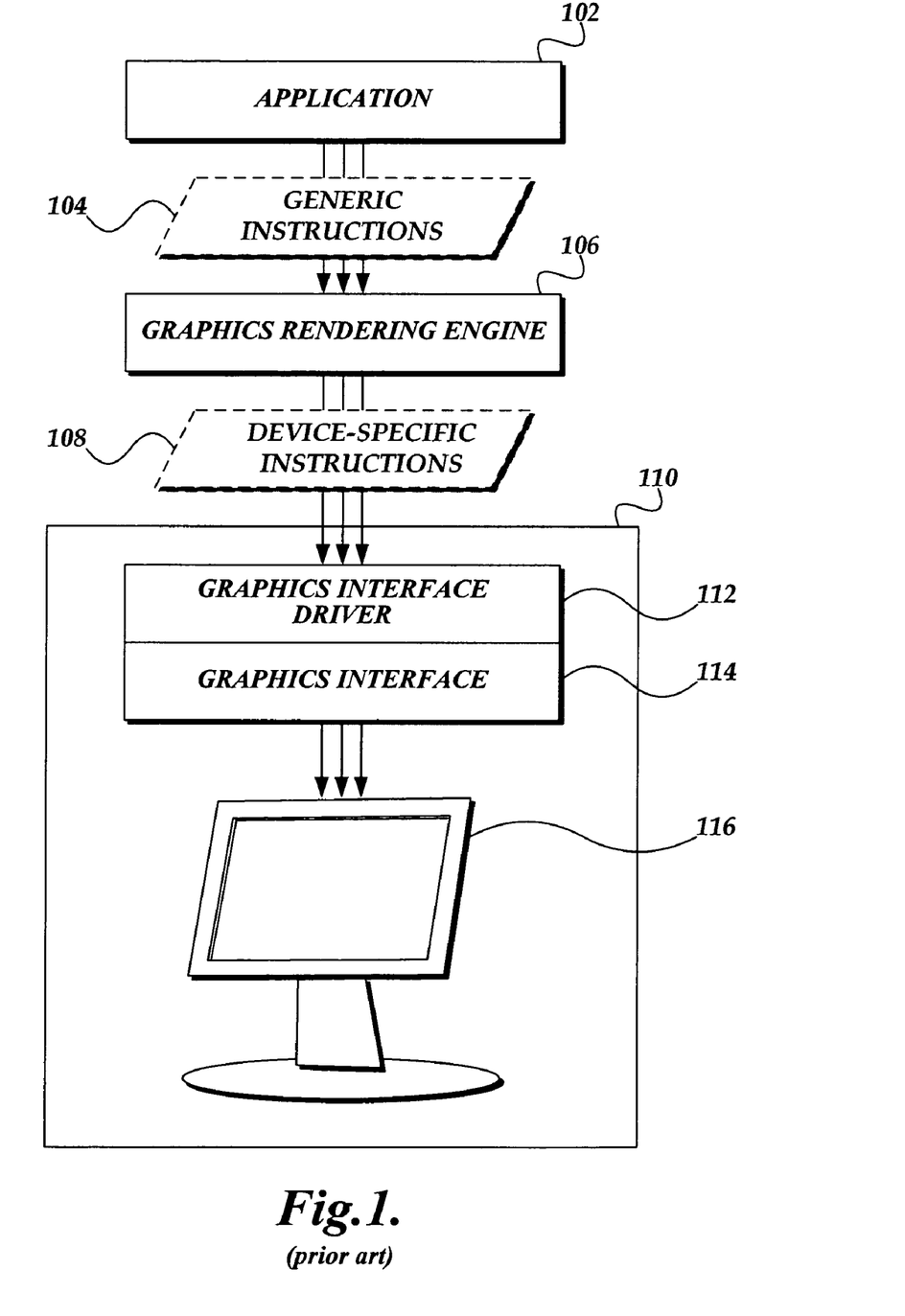
FIG. 1 is a pictorial diagram illustrating the flow of graphical information from an application to a display device, as found in the prior art.

A graphics rendering engine is a key component of most operating system environments. The graphics rendering engine provides a generic drawing interface to software applications, i.e., a generic drawing interface that is independent of the particular graphics interface installed on the host computer. The graphics rendering engine takes the generic drawing instructions it receives, converts them to the specific interface of the graphics interface, or its graphics interface driver installed on the host computer system, and transfers them to the graphics interface driver. FIG. 1 is a pictorial diagram illustrating the flow of graphical information from an application to a display device, as found in the prior art. In particular, an application 102 generates generic drawing instructions and data 104 directed at the generic interface provided by the graphics rendering engine 106. The graphics rendering engine 106 translates the generic instructions 104 to device-specific instructions 108 suitable for the graphics display subsystem 110, comprising a graphics interface driver 112 (software interface to the graphics interface hardware), the graphics interface 114, and the display device 116. Of course, other output devices, such as printers, plotters, and the like, may alternatively be used in place of a display device 116. In FIG. 1 the graphics interface driver 112 and graphics interface 114 are displayed together indicating a tightly coupled relationship between the two.

Given a set of generic instructions, the device-specific instructions output by an updated graphics rendering engine could vary substantially from the device-specific instructions output by the previous graphics rendering engine. Such differences could be the result of more efficient processing of the generic instructions, improved support for advanced features provided by the graphics interface 114, and the like. Accordingly, one cannot simply compare the output of the updated graphics rendering engine to the output of the prior version. Unfortunately, this means that the only way to evaluate whether there is regression in the updated graphics rendering engine is for a user to perform a side-by-side visual inspection of a computer with an updated graphics rendering engine and another, similarly configured computer, with the previous graphics rendering engine, as both execute the same instructions.

Figure 2:
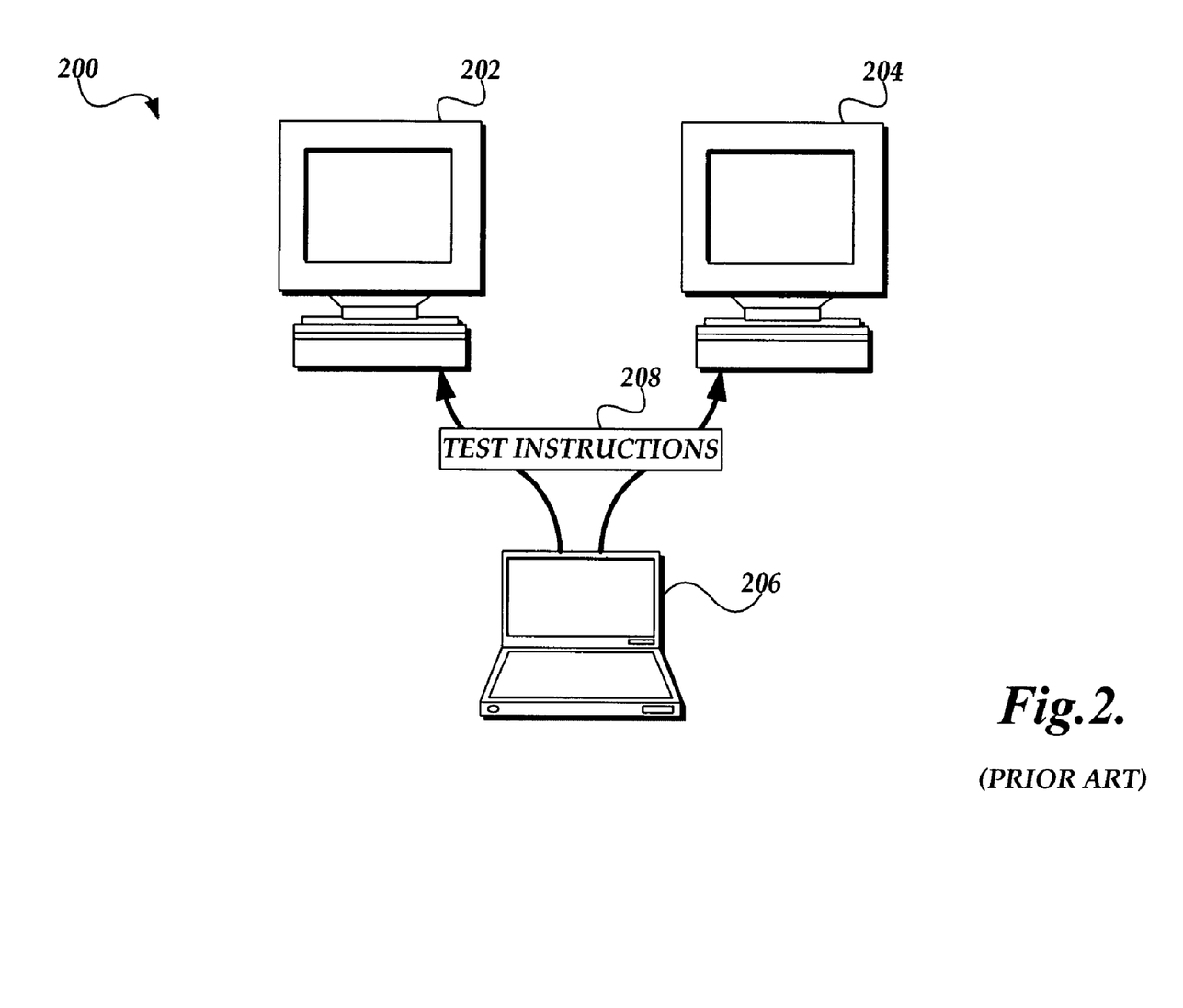
FIG. 2 is a pictorial diagram illustrating an exemplary comparison system, as found in the prior art, for determining whether there is regression in an updated graphics rendering engine.

FIG. 2 is a pictorial diagram illustrating an exemplary comparison system 200, as found in the prior art, for determining whether there is regression in an updated graphics rendering engine. More particularly, the exemplary comparison system 200 includes two similarly configured computers, a test computer 202 and control computer 204. The computers are configured as similarly as possible except that the test computer 202 includes an updated version of the graphics rendering engine, and the control computer 204 includes the previous version of the graphics rendering engine. A third computer, the master computer 206, is connected to both the test computer 202 and the control computer 204, sends test instructions 208 to test and control computers, typically at the direction of the user/visual inspector. As the test instructions 208 are sent to the subject computers, the user visually compares the results of the test instructions 208 as rendered on the computer monitors. When differences arise, they are noted by the user, typically with information corresponding to which test instructions have been executed thus far.

As those skilled in the art will appreciate, visual inspection is full of problems. User inspection is inefficient and can only be performed for short periods due to user fatigue. Users are also prone to miss differences, especially if they are subtle or fleeting in nature.

In light of the issues described above, what is needed is a system and method that automatically determines whether there is regression in an updated graphics rendering engine in comparison to a prior version of the graphics rendering engine. The present invention addresses this and other issues found in the prior art.

SUMMARY OF THE INVENTION

According to aspects of the present invention, a system for validating the output of an updated graphics rendering engine is presented. The system includes two similarly configured computer systems, except that the one computer system includes an updated graphics rendering engine. The two computers are configured to execute test instructions that cause graphic information to be rendered on the computers. The two computers are further configured to respond to sample requests during the execution of the test instructions. Each computer responds by retrieving the currently rendered data on the computer as a rendered sample. The system also includes a master computer. The master computer is configured to retrieve the rendered samples of the two computers, compare the rendered samples to determine whether there are differences between them, and if there are differences, report those differences.

According to additional aspects of the present invention, a computer-readable medium bearing computer-executable instructions is presented. The computer-executable instructions, when executed on a computer, carry out a method for validating the graphical output of an updated graphics rendering, comprising the following. A plurality of test instructions are transmitted to a first and second computer for execution. The first and second computers are similarly configured except that the second computer includes an updated graphics rendering engine. At least one sample request is transmitted to the first and second computers such that each computer obtains the currently rendered data on the computer and returns the rendered data to the master computer as a rendered sample. The rendered samples are retrieved from the first and second computers. The rendered samples are compared to determine whether they are the same image.

According to yet additional aspects of the present invention, a method for validating the graphical output of an updated graphics rendering engine is presented. A set of test instructions are executed on a first and second computer. The first and second computers are similarly configured except that the second computer is configured with an updated graphics rendering engine. The first and second computers respond to at least one sample request issued to the computers at the same point of execution of the test instructions such that each computer obtains the currently rendered data on the computer. The rendered samples from the first and second computers are compared to determine whether they are the same image.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While the following discussion is made in regard to a graphic rendering engine, such as Microsoft Corporation's Direct X or Windows NT GDI graphics rendering engines, it should be appreciated that the present invention may be applied to other software and/or hardware modules that generate graphical information and that are also susceptible to regression in their updates. These additional software and hardware modules may include, but are not limited to, top-level software applications, software image and/or data rendering modules, software and/or firmware codecs (coders/decoders), and the like.

Figure 3:
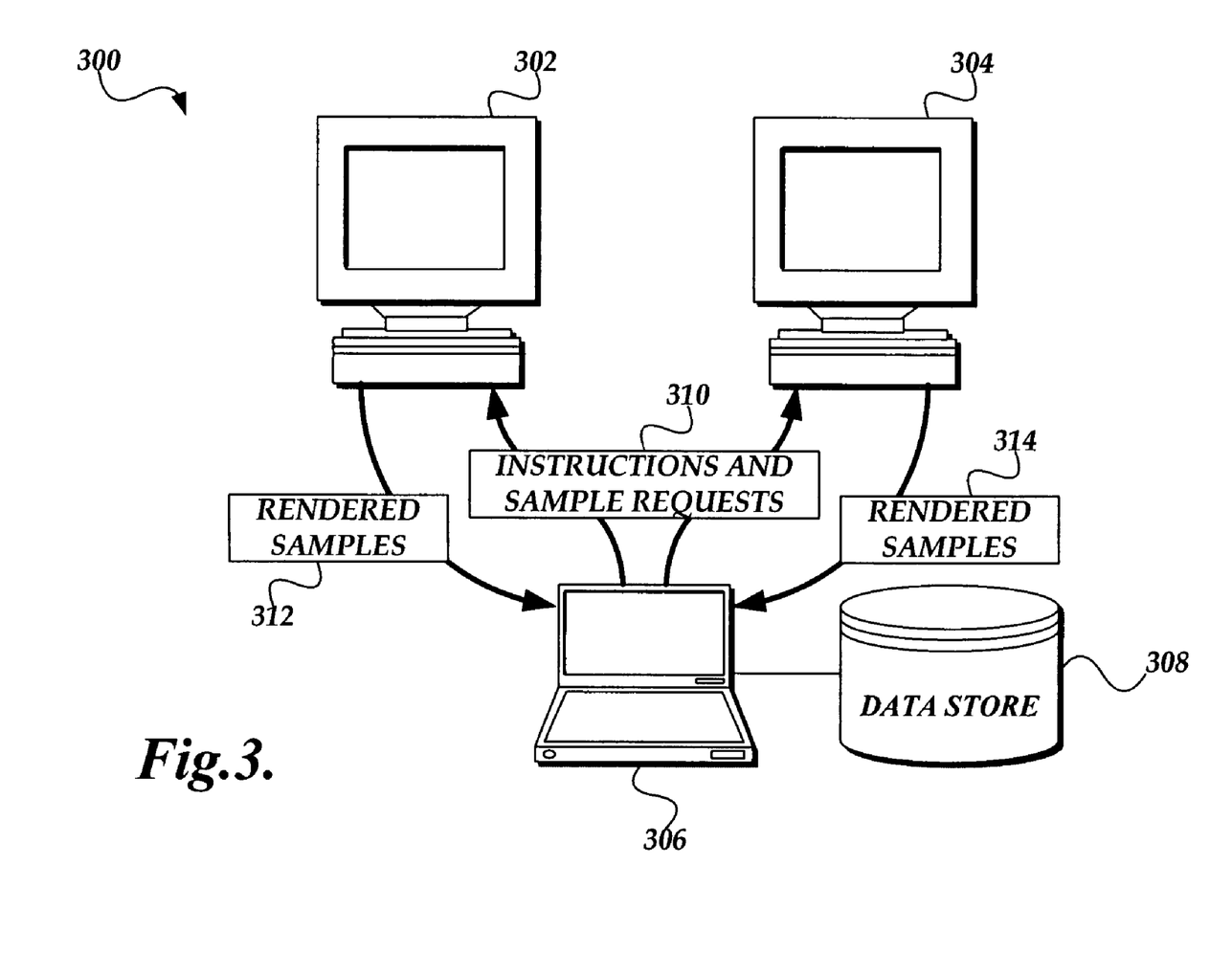
FIG. 3 is a pictorial diagram illustrating an exemplary comparison system configured according to aspects of the present invention, for validating whether there is regression in an updated version of a graphics rendering engine or other software component.

FIG. 3 is a pictorial diagram illustrating an exemplary comparison system 300 for validating whether there is regression in an updated version of a graphics rendering engine. The exemplary system 300 includes a test computer 302, the test computer having the updated version of the graphics rendering engine installed and operating, and a control computer 304, the control computer having the previous version of the graphics rendering engine installed and operating. The exemplary system 300 also includes a master computer 306 and a data store 308, the data store being a disk drive, an online data store, local memory, removable media, and the like.

With regard to the test computer 302 and control computer 304, according to one embodiment, both computers should be configured as similarly as possible, except for the differences between the graphics rendering engines. Ensuring that the subject computers are configured similarly reduces the potential of invalidating the validation results because of the differences. However, as long as the differences between computers do not give rise to differences in rendered data, it should be understood that a "similar configuration" may correspond to only the updated graphics rendering engine, Thus, the test computer may be running Microsoft Corporation's Windows XP operating system, while the control computer is running Microsoft Corporation's Windows 2000 operating system, or alternatively, a Linux derivative operating system, so long as these differences do not play a factor in the rendered output. Additionally, it should be understood that the test computer and control computer need not even be the same type of computer. For example, the test computer may be a personal digital assistant (PDA), a notebook, or the like, while the control computer is a generic desktop personal computer, a mainframe, etc. Thus, the present invention should not be construed as limiting to any particular hardware configuration.

In operation, the master computer 306 issues test instructions to the test computer 302 and the control computer 304 designed to cause both computers to generate drawing instructions to the graphics rendering engine for display/output on their respective computer monitors (or other output device utilized on the computer system). Typically, an application on both computers receives the instructions from the master computer 306 and executes them on the computer. Of course, executing the test instructions 310 may involve sending drawing instructions directly to the graphics rendering engine, or may involve sending instructions to other applications and processes which may ultimately cause those other applications to send drawing instructions to the graphics rendering engine.

Included with the test instructions 310 are sample requests, requesting that the subject computer return a current snapshot of the rendered data, i.e., the data (including images, animation, effects, and the like) output by the graphics rendering engine. The sample requests may be handled by the receiving application mentioned above, by the graphics rendering engine, or any other process executing on the computer that has access to the rendered data. However, for simplicity purposes, the following discussion will assume that the graphics rendering engine receives and responds to the sample requests.

Upon receiving a sample request, the graphics rendering engine responds with a current snapshot of the rendered data. Typically, this rendered data is accessible to the graphics rendering image via the graphics interface driver 112. The current snapshot (referred to as the rendered sample) will likely be in the form of bit-mapped, rasterized data, but may also include vector data, compressed and or encrypted data, and the like.

After obtaining the rendered sample, the graphics rendering engine (or other related application operating on the computer) returns the rendered sample to the master computer 306. As the test instructions 310 are transmitted to both the test computer 302 and control computer 304, including the sample requests, both the test computer and control computer respond with a rendered sample, i.e., rendered samples 312 and 314. This pair or set of rendered samples are stored, at least temporarily, in the data store 308. After obtaining at least one set of rendered samples, a comparison process executed on the master computer 306 retrieves the set of rendered samples and compares the rendered sample 312 from the test computer to the rendered sample 314 from the control computer 304 to determine if there are differences. Differences between the two, especially if those differences rise above a predetermined threshold, indicate the presence of regression in the updated graphics rendering engine on the test computer 304.

Those skilled in the art will appreciate that the exemplary comparison system 300 of FIG. 3 represents only one configuration/embodiment in which the present invention may be implemented. In an alternative embodiment, each of the subject computers, i.e., the test computer 302 or the control computer 304, obtains a complete set of test instructions 310 with sample requests. The test computer 302 or control computer 304 could execute the test instructions 310 asynchronously to the execution of the test instructions on the other computer, and store the rendered samples locally on the computer until they are retrieved in a process that compares the rendered samples to the corresponding rendered samples of the other computer. Of course, numerous other configurations may also be utilized in sampling a test and control computer as they execute test instructions, all of which are anticipated as falling within the scope of the present invention.

It should be appreciated that the test instructions 310 should be directed to features that are common to both the updated graphics rendering engine and its predecessor. Clearly, finding differences between the updated graphics rendering engine and the previous version of the graphics rendering engine with regard to dissimilar features is not indicative of regression in the updated version. Similarly, test instructions should also avoid testing common features which have been updated in the updated graphics rendering engine, and particularly avoid corrections made to fix issues found in the prior version. Alternatively, a comparison process that compares the rendered samples to compare whether there are differences can be modified to ignore differences that are the result of intentional modifications and not indicative of regression.

In regard to the rendered samples, in order to be most useful, it is often necessary to be able to correlate a particular pair of rendered samples with the instructions that have been executed. Thus, according to aspects of the present invention, a token or log is associated with a rendered sample that indicates which instructions in the test instructions 310 have been executed.

Figure 4:
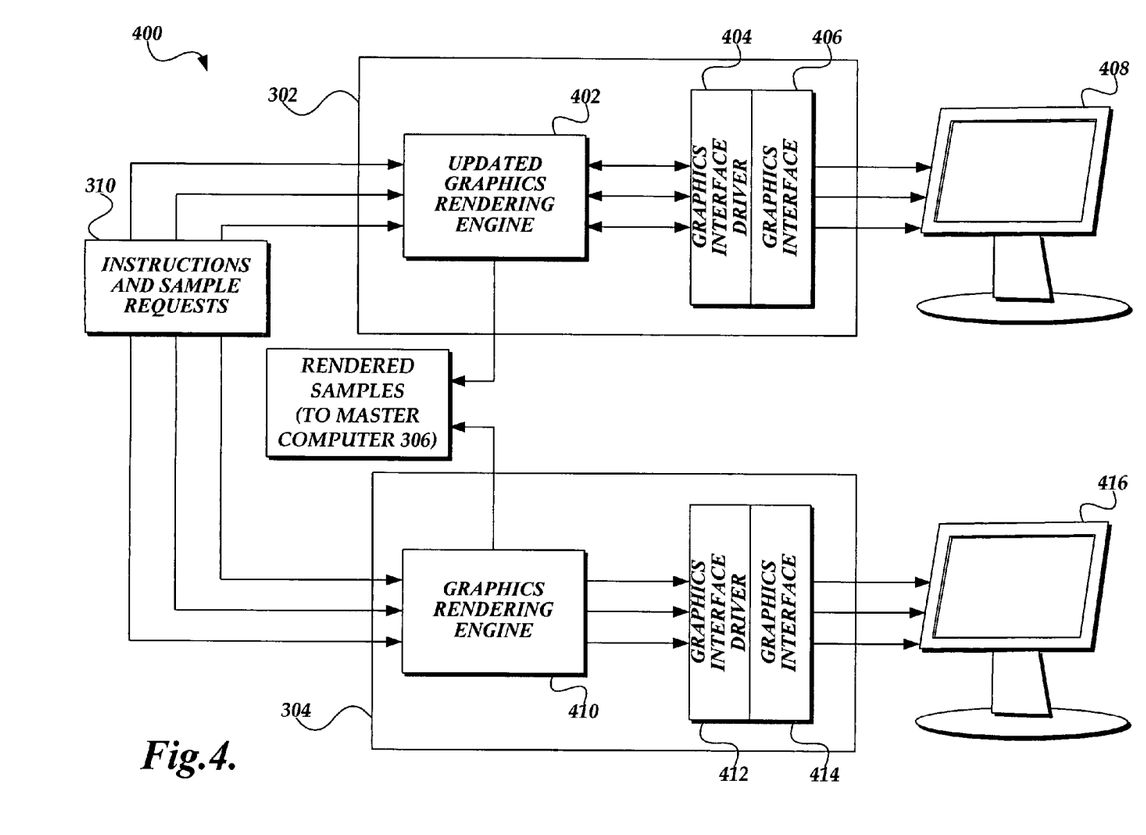
FIG. 4 is a pictorial diagram illustrating the flow of information, including instructions and graphical data, received from a master computer, through components of the subject computers, and the return of rendering samples to the master computer, according to aspects of the present invention.

FIG. 4 is a pictorial diagram illustrating the flow of information from the master computer 306 through components of the test and control computers, and the return of rendered samples to the master computer in response to sample requests according to aspects of the present invention. As discussed above, test instructions 310 are sent to both the test computer 302 and the control computer 304 causing the graphics rendering engines to transfer device-specific graphical data to a graphics interface driver, such as graphics interface drivers 404 and 412. The graphics interface drivers transfer that information to the graphics interface, such as graphics interfaces 406 and 414, which in turn renders the graphical information to a display device, such as display devices 408 and 416.

As indicated above, in addition to the test instructions, sample requests are sent to the graphics rendering engines 402 and 410. These sample requests may be issued in conjunction with or independently from the test instructions 310, issued periodically, at predetermined execution points, or in an ad hoc manner at the direction of a user. Clearly, rendered samples should be taken at approximately the same time, and in particular, should be taken such that the same test instructions have been executed on both the test computer 302 and the control computer 304.

As shown in FIG. 4, according to one embodiment of the present invention, upon receiving a sample request, the graphics rendering engines 404 and 410 are configured to obtain a rendered sample from their respective graphics interface drivers 404 and 412, and return the rendered samples to the master computer 306.

It should be appreciated that while the present discussion describes that the graphics rendering engines 404 and 410 retrieve the rendered samples from the respective graphics interface drivers 404 and 412, the present invention is not so limited. In an alternative embodiment, the rendered samples can be obtained by a software module (not the graphics rendering engines) that makes calls to available functions of the graphics interface drivers and/or by data reads on the graphics interfaces. In this manner, a separate module (other than the graphics rendering engine) that handles sample requests can obtain the rendered samples without that functionality existing in the graphics rendering engines.

Figure 5A:
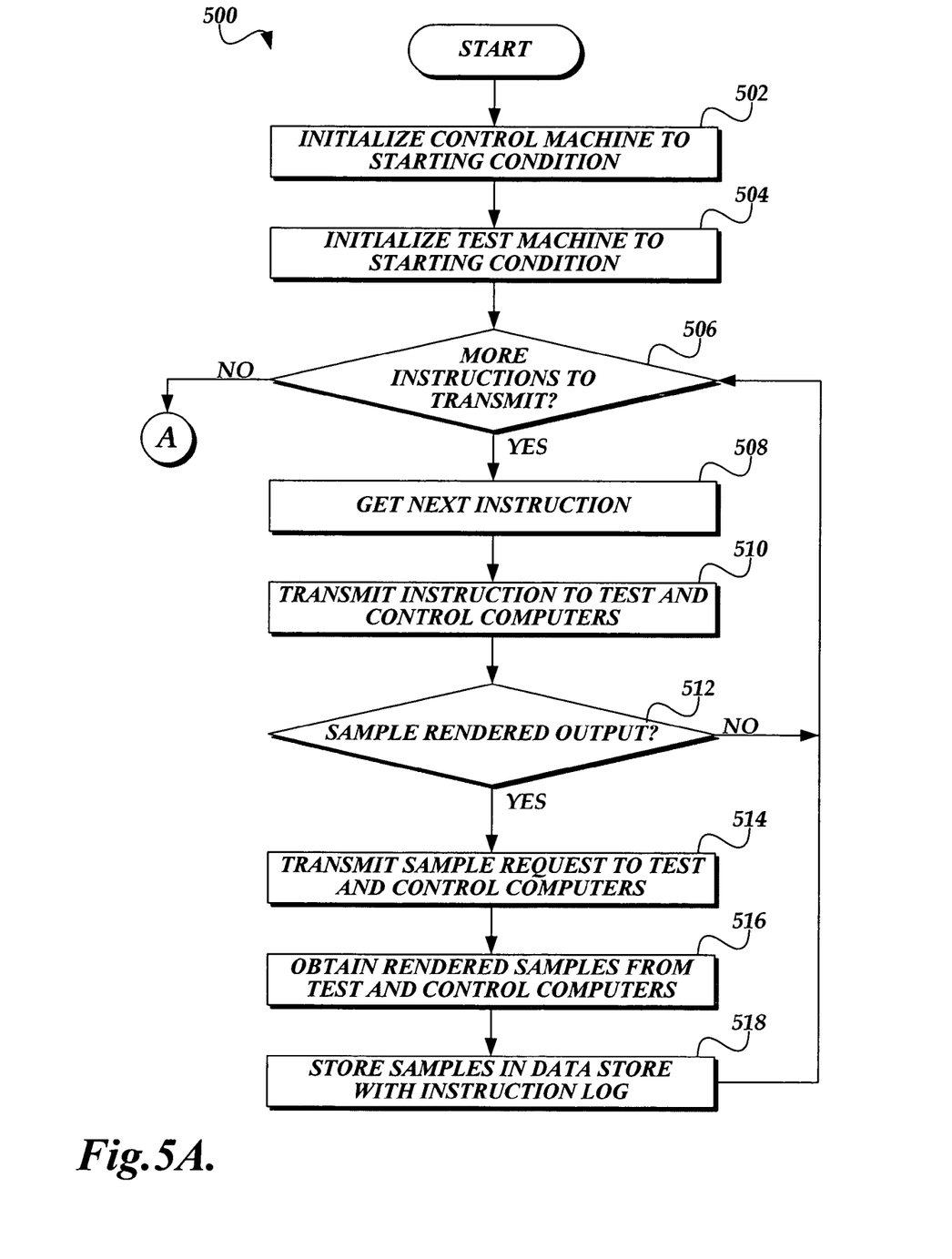
FIGS. 5A and 5B are a flow diagram illustrating an exemplary routine 500 for determining whether there is regression in an updated graphics rendering engine.
Figure 5B:
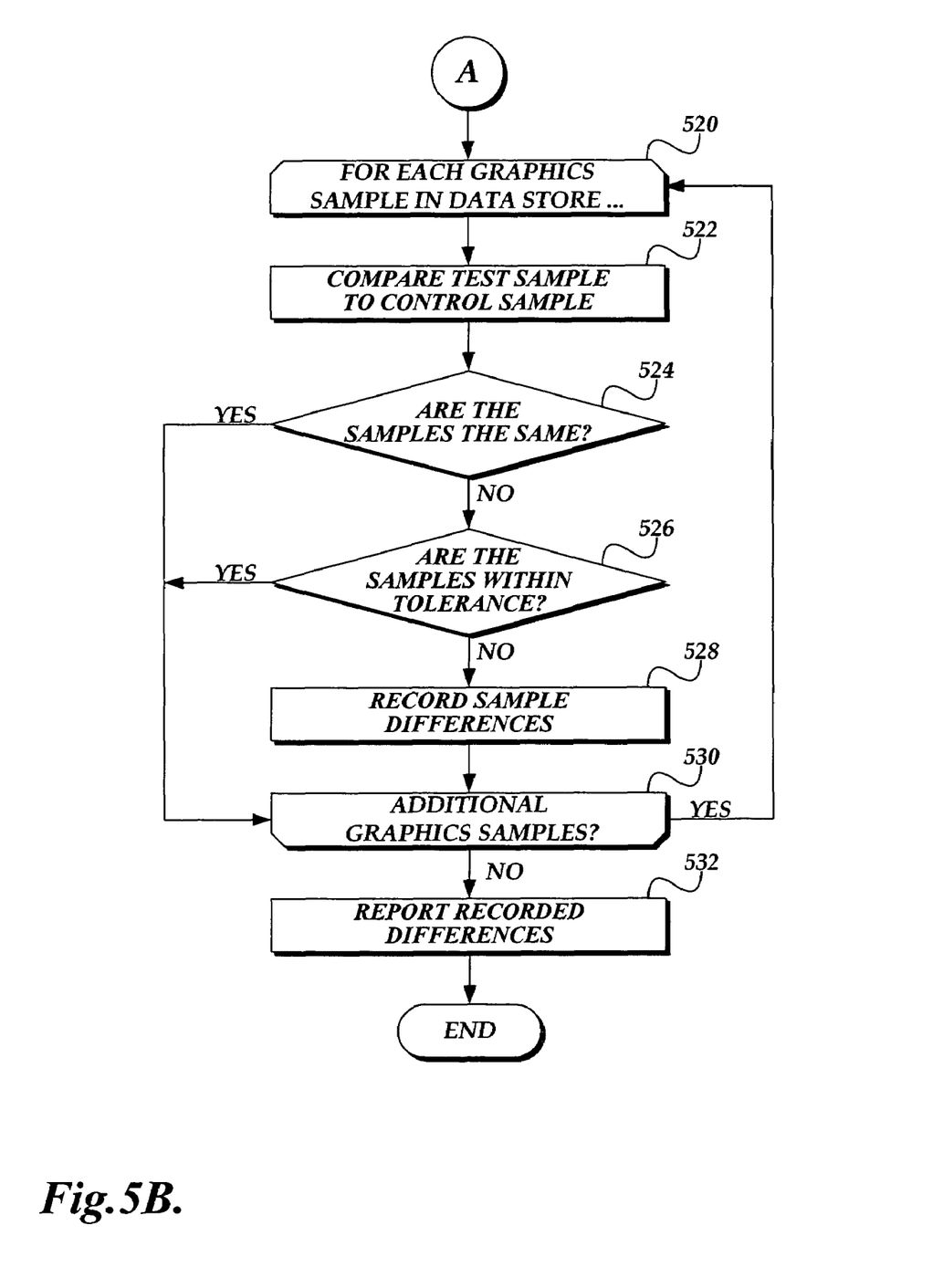

FIGS. 5A and 5B are a flow diagram illustrating an exemplary routine 500 for determining whether there is regression in an updated graphics rendering engine. Beginning at block 502, the control computer 304, which includes the previous version of the graphics rendering engine, is initialized into a known starting condition. At block 504, the test computer 302, which includes the updated version of the graphics rendering engine, is initialized to the same starting condition.

It should be appreciated that while the present discussion assumes that the test and control computer systems are initialized to the same starting condition, it is not a necessary condition. In an alternative embodiment, the test instructions may include specific directives that initialize the test and/or control computers to a starting condition.

At decision block 506, a determination is made as to whether there are any more test instructions to be transmitted to the subject computers. If there are additional test instructions to be transmitted, at block 508, the next test instruction to be transmitted to the subject computers is retrieved. At block 510, the test instruction is transmitted to both the test computer 302 and the control computer 304.

At decision block 512, a determination is made as to whether to request a rendered sample from the test and control computers. If a sample request is not made, the routine 500 returns again to block 506, where it determines whether there are additional test instructions to execute/transmit to the subject computers.

If a sample request is made, at block 514, the sample request is sent to both the test computer 302 and the control computer 304. At block 516, a rendered sample from both the test computer 302 and the control computer 304 is obtained. At block 518, the rendered samples are stored in the data store 310, typically with an indication as to which instructions that have thus far been executed on the subject computers. Thereafter, the routine 500 returns again to decision block 506 to determine whether more test instructions are to be transmitted to the subject computers.

The routine 500 continues in the above-described manner until, at decision block 506, there are no more test instructions to be transmitted to the subject computers, whereupon the routine 500 proceeds to control block 520 (FIG. 5B).

At control block 520, a looping construct is started that iterates through each set of rendered samples stored in the data store 310. At block 522, with one of the rendered sample pairs from the data store 310, the rendered sample from the test computer 302 (i.e., the test sample) is compared to the rendered sample from the control computer 304 (i.e., the control sample), each corresponding to the other in regard to the test instructions that had been executed. At decision block 524, a determination is made as to whether the test sample and the control sample are the same. If the test and control samples are the same, the routine 500 proceeds to end control block 530 where its function is to determine whether any additional rendered sample pairs are stored in the data store 310 to be examined. If additional rendered sample pairs are stored in the data store 310, the routine 500 returns to control block 520 where the next rendered sample pair is retrieved from the data store 310.

However, at decision block 524, if the test and control samples are not the same, at decision block 526 another determination is made as to whether the differences between the test and control samples fall within a predetermined tolerance. In other words, according to one embodiment of the present invention, if the differences between the test and control samples are within a predetermined tolerance, the differences may be considered insignificant and disregarded. Thus, when differences fall within a predetermined tolerance, the routine 500 proceeds to end control block 530 to check for additional rendered sample pairs as described above.

If the differences between the test and control samples do not fall within a predetermined tolerance, at block 528 a record is made as to the differences between the test and control samples. Typically, in addition to recording the differences between the test and control samples, a reference or token indicating where in the test instructions the difference occurred in is also placed in the record. Thereafter, the routine proceeds to end control block 530, as described above, to test whether additional rendered sampled pairs are stored in the data store 310.

The exemplary routine 500 continues in the manner described above until, at end control block 530, no additional rendered sampled pairs are available for evaluation in the data store 310. The routine 500 then proceeds to block 532 where any recorded differences between the control sample and the test sample are reported. Thereafter, the routine 500 terminates.

Figure 6A:
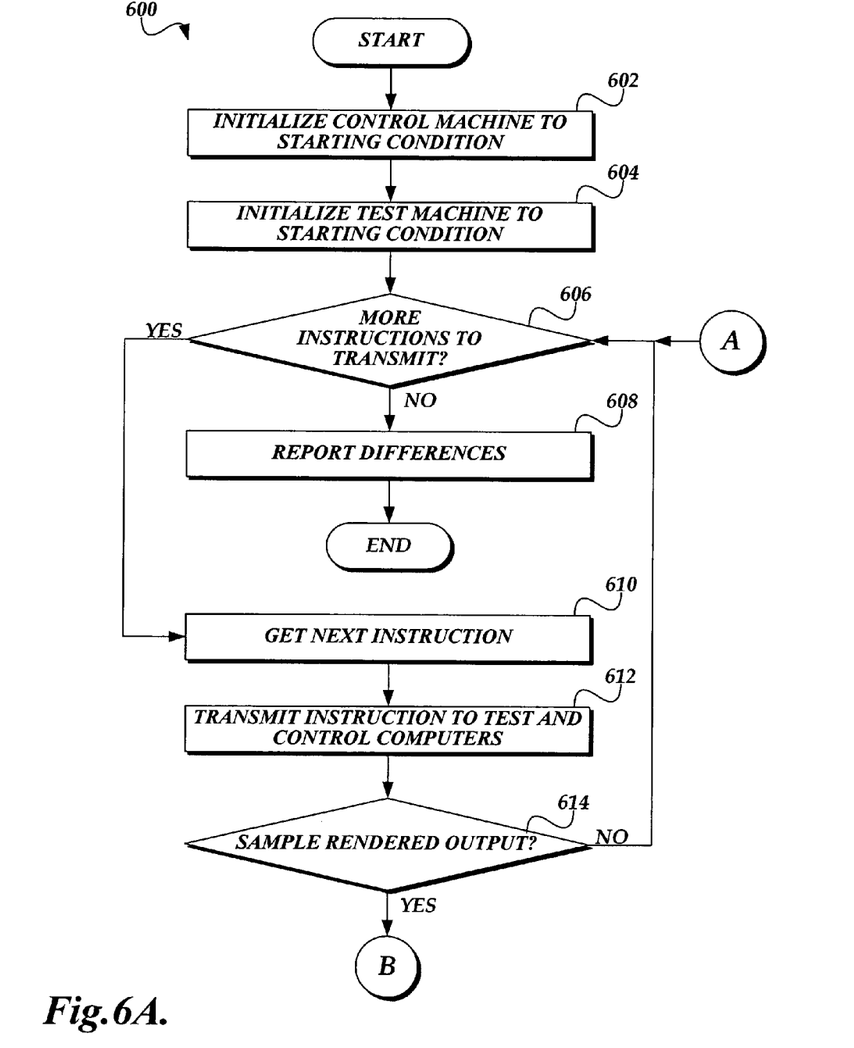
FIGS. 6A and 6B illustrate a flow diagram of an alternative exemplary routine for determining whether there is regression in an updated graphics rendering engine, where the differences are determined as the rendered samples are collected.
Figure 6B:
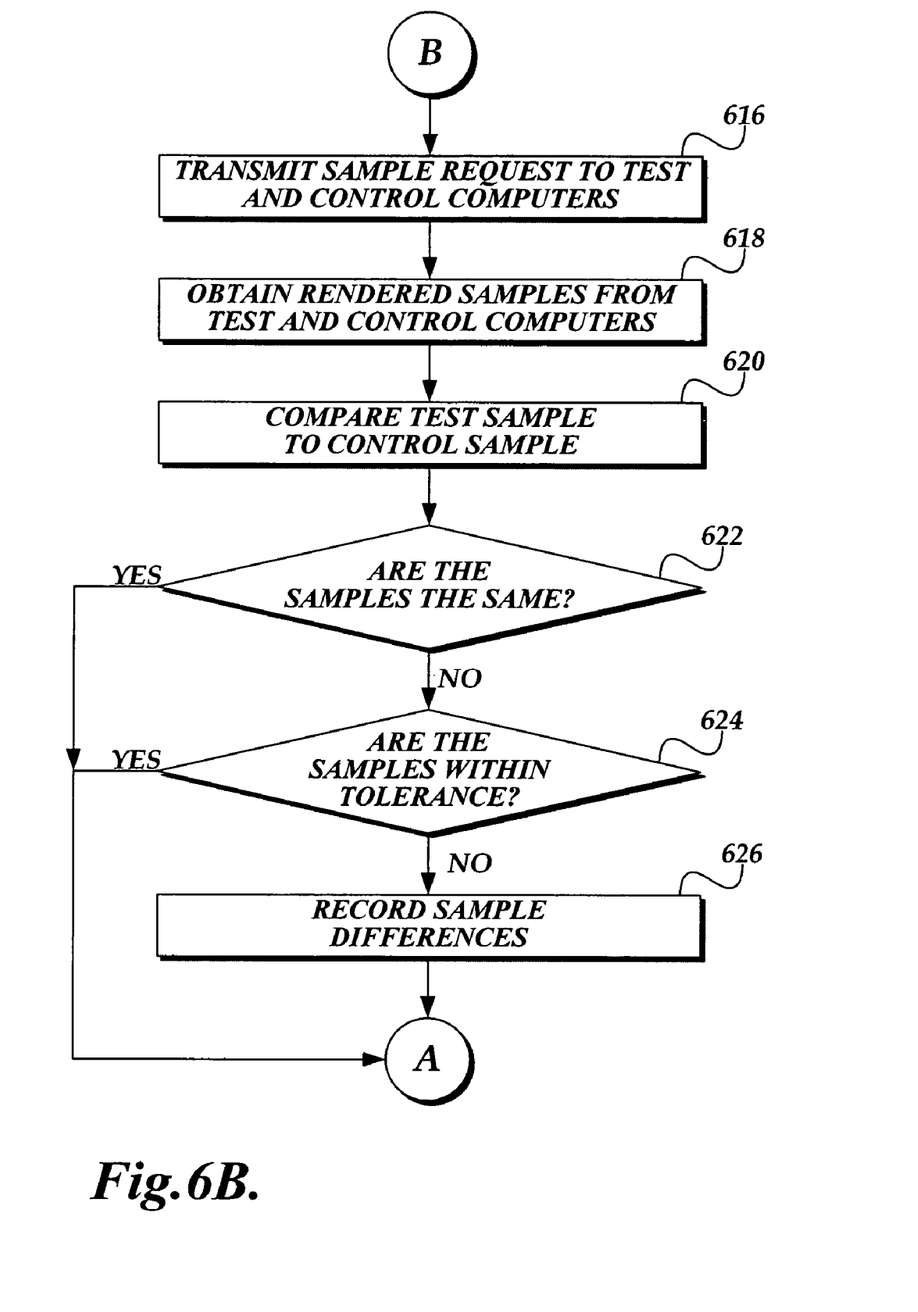

With regard to the exemplary routine 500, and more particularly in determining the differences between the samples after all instructions have executed, the invention is not so limited. FIGS. 6A and 6B are a flow diagram illustrating an alternative exemplary routine 600 for determining whether there is regression in an updated graphics rendering engine, where the differences are determined as the rendered samples are collected.

Beginning at block 602, the control computer 304, which includes the previous version of the graphics rendering engine, is initialized into a known starting condition. At block 604, the test computer 302, which includes the updated version of the graphics rendering engine, is initialized to the same starting condition.

At decision block 606, a determination is made as to whether there are any more test instructions to be transmitted to the subject computers. If there are additional test instructions to be transmitted, at block 610, the next test instruction to be transmitted to the subject computers is retrieved. At block 612, the test instruction is transmitted to both the test computer 302 and the control computer 304.

At decision block 614, a determination is made as to whether to request a rendered sample from the test and control computers. If a sample request is not made, the routine 600 returns again to block 606, where it determines whether there are additional test instructions to execute/transmit to the subject computers.

If a sample request is made, at block 616 (FIG. 6B), the sample request is sent to both the test computer 302 and the control computer 304. At block 618, a rendered sample from both the test computer 302 and the control computer 304 is obtained.

At block 620, the rendered sample obtained from the test computer 302 (i.e., the test sample) is compared to the rendered sample obtained from the control computer 304 (i.e., the control sample). At decision block 622, a determination is made as to whether the test sample and the control sample are the same. If the test and control samples are the same, the routine 600 returns to block 606 (FIG. 6A) to determine whether there are additional test instructions for processing.

If the test and control samples are not the same, at decision block 624, another determination is made as to whether the differences between the test and control samples fall within a predetermined tolerance. If the differences fall within a predetermined tolerance, the routine 600, the differences are considered insignificant and the routine 600 returns to block 606 (FIG. 6A) to determine whether there are additional test instructions for processing.

If the differences between the test and control samples do not fall within a predetermined tolerance, at block 626 a record is made as to the differences between the test and control samples. As mentioned above in regard to FIGS. 5A and 5B, in addition to recording the differences between the test and control samples, a reference or token indicating where in the test instructions the difference occurred is typically also recorded. Thereafter, the routine 600 returns to block 606 (FIG. 6A) to determine whether there are additional test instructions for processing.

Processing of routine 600 continues as described above until, at decision block 606 (FIG. 6A), there are not additional test instructions to execute. At this point, the routine 600 proceeds to block 608 where the recorded differences between the test samples and the control samples are reported. Thereafter, the exemplary routine 600 terminates.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A system for validating the output of an updated graphics rendering engine, the system comprising:
   a first and second computer, wherein said first and second computers are configured such that said second computer includes an updated graphics rendering engine, wherein said first and second computers are configured to execute test instructions that cause graphic information to be rendered on said first and second computers, and wherein said first and second computers are configured to respond to at least one sample request during the execution of the set of test instructions by retrieving the currently rendered data on the computer as a rendered sample; and
   a master computer configured to obtain the rendered samples of said first and second computing devices, compare the corresponding rendered samples of said first and second computers to determine whether there are differences between corresponding rendered samples, and if there are differences, report those differences.

2. The system of claim 1, wherein the at least one sample request is embedded in the test instructions.

3. The system of claim 1, wherein said master computer is communicatively coupled to said first and second computers, wherein said master computer transmits test instructions to said first and second computers for execution, and wherein said first and second computers are configured to execute the transmitted test instructions upon receiving them.

4. The system of claim 3, wherein the at least one sample request is generated by said master computer and transmitted to said first and second computers.

5. The system of claim 4, wherein said master computer generates a plurality of sample requests and transmits the plurality of sample requests to said first and second computers on a periodic basis in conjunction with the transmission of the test instructions.

6. The system of claim 4, wherein said master computer generates a plurality of sample requests and transmits the plurality of sample requests to said first and second computers at random times in conjunction with the transmission of the test instructions.

7. The system of claim 4, wherein said master computer generates a sample request and transmits the sample request to said first and second computers in conjunction with the transmission of the test instructions in response to a user request.

8. The system of claim 3 further comprising a data store, and wherein said first and second computers store rendered samples in the data store.

9. The system of claim 8, wherein said data store is communicatively coupled to said master computer, and said first and second computers store rendered samples in the data store by transmitting them to said master computer which stores them in the data store.

10. The system of claim 9, wherein said master computer stores an instruction log indicating the instructions that have thus far been executed by said first and second computers in conjunction with the rendered samples from said first and second computers.

11. A computer-readable medium bearing computer-executable instructions which, when executed on a master computer, carry out a method for validating the graphical output of an updated graphics rendering, the method comprising:
    transmitting a plurality of test instructions to a first and second computer for execution, wherein the first and second computers are configured such that the second computer includes an updated graphics rendering engine;
    transmitting at least one sample request to the first and second computers such that each computer obtains the currently rendered data on the computer and returns that rendered data to the master computer as a rendered sample;
    receiving the rendered samples from the first and second computers; and
    comparing the rendered samples from the first and second computers to determine whether they are the same image.

12. The computer-readable medium of claim 11, wherein the at least one sample request is embedded in the test instructions.

13. The computer-readable medium of claim 11, wherein the master computer transmits a plurality of sample requests to the first and second computers, receives rendered samples for each sample request, and compares the rendered samples from each sample request to determine whether they are the same image.

14. The computer-readable medium of claim 13, wherein the master computer transmits the plurality of sample requests to the first and second computers on a periodic basis during transmittal of the test instructions.

15. The computer-readable medium of claim 13, wherein the master computer transmits the plurality of sample requests to the first and second computers at random times during transmittal of the test instructions.

16. The computer-readable medium of claim 13, wherein the master computer transmits the plurality of sample requests to the first and second computers in response to a user directive to obtain a pair of rendered samples during transmittal of the test instructions.

17. The computer-readable medium of claim 13 further comprising storing the rendered samples from the first and second computers in a data store.

18. The computer-readable medium of claim 17, wherein storing the rendered samples from the first and second computers in a data store further comprises storing the rendered samples in the data store with a log indicating which test instructions have been transmitted to and executed on the first and second computers.

19. A method for validating the graphical output of an updated graphics rendering, the method comprising:
    executing a set of test instructions on a first and second computer, wherein the first and second computer are similarly configured except that the second computer is configured with an updated graphics rendering engine;
    responding to at least one sample request issued to the first and second computers at the same point of execution of the test instructions such that each computer obtains the currently rendered data on the computer;
    comparing the rendered samples from the first and second computer to determine whether they are the same image; and
    in response to determining that the rendered samples are not the same image, determining which test instruction in the set of instructions caused the difference in the rendered samples.

20. The method of claim 19, wherein the at least one sample request comprises a plurality of sample requests distributed within the test instructions.

* * * * *